July 11, 1933. M. F. CARR 1,917,825
SEPARABLE SNAP FASTENER INSTALLATION
Filed Nov. 7, 1930
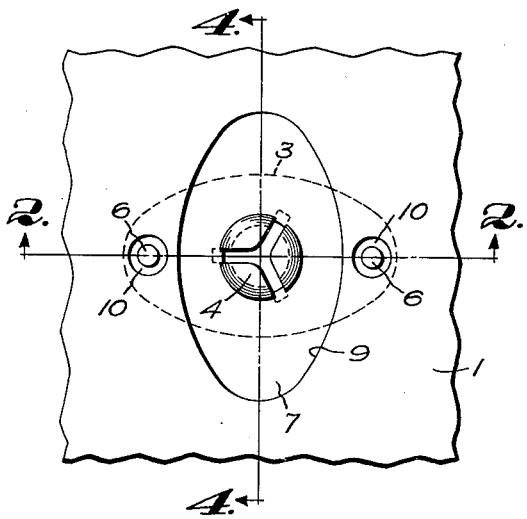
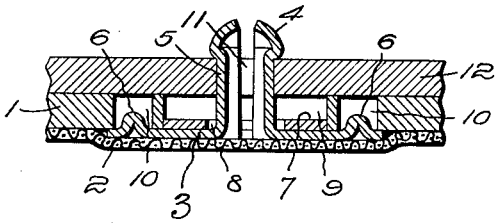
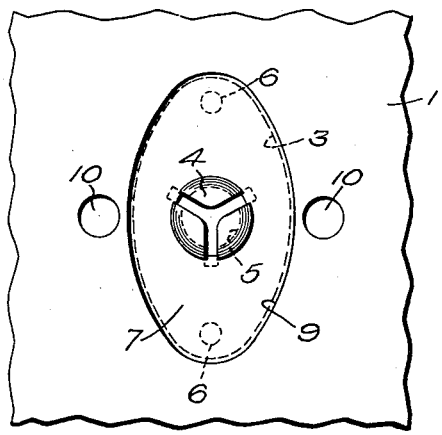
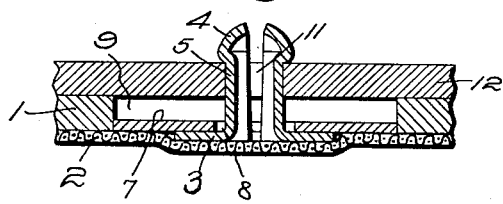
Inventor:
Moses F. Carr
by Emery, Booth, Varney & Townsend
Attys Patented July 11, 1933

1,917,825

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE SNAP FASTENER INSTALLATION

Application filed November 7, 1930. Serial No. 494,021.

My invention aims to provide improvements in separable snap fastener installations.

In the drawing which illustrates a preferred embodiment of my invention:—

Figure 1 is an elevational view of a portion of an upholstery panel for attachment to a frame structure and shows the manner of attachment of the fastener stud member;

Fig. 2 is a section taken on the line 2—2 of Figure 1 showing the lost motion connecting means;

Fig. 3 is a view of the parts shown in Figure 1 as they appear before the base of the stud is turned to engage beneath the apertured part; and Fig. 4 is a section taken on the line 4—4 of Figure 1.

In the particular embodiment of my invention selected for illustration of my invention, I have shown an upholstery installation secured together by means of separable snap fastening elements. My invention is particularly, though not exclusively, adapted for securing upholstered panels to the body framework of motor vehicles, because the upholstered part, which comprises a cardboard, or the like, backing 1 covered on one side with a flexible trimming material 2 (Figs. 2 and 4), may be made up prior to attachment to the frame without assembling the fasteners thereto. My invention, therefore, is for the type of installation wherein the snap fastener members are attached to the upholstered part just prior to assembly of the installation.

The fastener unit to be attached to the upholstered part is in the nature of a stud member having a base 3 elongated in one direction. The base illustrated in the drawing is shown as being oval in outline, but it should be understood that the base may be almost any shape which is non-circular in outline. The material of the base 3 is pressed out to provide the usual head 4 and long neck 5, as shown in Fig. 2. At opposite sides of the head and neck portion of the stud I have provided in the base, near the ends of the elongated portion, small bosses 6 which extend from the base in the same direction as the head and neck. As a part of the stud unit I also provide a washer 7 the same shape as the base 3 and having an aperture 8 so that it may fit over the head 4 of the stud.

The assembly of the stud with the upholstered part is a very simple operation. Assuming that the backing 1 has been prepared by providing the elongated aperture 9 therein, together with small apertures 10 at the sides of the aperture 9, and that one side of the backing is covered by material 2 so that the aperture 9 is exposed at one side only of the upholstered part, the attachment of the fastener is made as follows:—First, the stud base 3 and washer 7 are placed in the aperture 9, as shown in Fig. 3, and then, with the stud base beyond the surface of the backing 1 and against the covering material 2, the head 4 of the stud is grasped and turned, thereby turning the base 3 beneath the backing until the bosses 6 engage the apertures 10, as shown in Figs. 1 and 2. During the turning operation the washer remains in the aperture 9 and centers the stud so that the bosses will be brought into proper registry with the apertures 10.

When the stud is assembled with the upholstered part in the manner just described the base lies between one face of the backing 1 and the covering 2 and while it may shift laterally in all directions it is locked by the bosses 6 against accidental return to a position from which it might pull loose from the backing.

Lateral shifting of the stud is permitted to permit alignment of the stud with the stud-receiving aperture 11 in the frame part 12. The lateral shifting is provided for by the fact that the aperture 8 in the washer is larger than the cross-sectional area of the neck 5 and each of the apertures 10 is larger in cross-sectional area than its cooperating boss 6, as clearly shown in Fig. 2.

While I have illustrated and described a preferred embodiment of my invention, I do not wish to be limited thereby, because the scope of my invention is best defined by the following claims.

I claim:

1. A snap fastener installation comprising, in combination, a relatively rigid fastener-carrying structure having an elongated aperture, a flexible covering material applied to said structure to cover the aperture at one side and a snap fastener member attached to said fastener-carrying structure by entrance through the aperture at that side of the structure at which the aperture is exposed, said snap fastener member comprising a base part elongated in one direction and turned to engage said structure at that side adjacent to the covering material to secure the snap fastener member to the said fastener-carrying structure and interengaging means provided partly by the elongated base part and partly by the fastener-carrying structure to prevent accidental turning of the base part to a withdrawal position after it is engaged behind said structure.

2. A snap fastener installation comprising, in combination, a fastener-carrying structure having an elongated aperture, a covering material applied to said structure to cover the aperture at one side and a snap fastener member attached to said fastener-carrying structure by entrance through the aperture at that side of the structure at which the aperture is exposed, said snap fastener member comprising a base part elongated in one direction and turned to engage said structure at that side adjacent to the covering material to secure the snap fastener member to the said fastener-carrying structure and a lost motion connection between said fastener member and said structure to permit lateral movement of the fastener member relative to said structure and to lock the fastener member against accidental turning of the base after it is engaged behind said structure.

3. A snap fastener installation comprising, in combination, a fastener-carrying structure having an elongated aperture, a covering material applied to said structure to cover the aperture at one side and a snap fastener member attached to said fastener-carrying structure by entrance through the aperture at that side of the structure at which the aperture is exposed, said snap fastener member comprising a base part elongated in one direction to pass through the elongated aperture, said base being turned to underlie said structure in a relation cross-wise to the greatest length of the elongated aperture therein, means locking the said base against substantial turning movement when attached to the said fastener carrying structure and a washer fitting in said aperture and providing means to assist in guiding the base into proper attached relation to the said structure.

4. A snap fastener installation comprising, in combination, a fastener-carrying structure having an elongated aperture, a covering material applied to said structure to cover the aperture at one side and a snap fastener member attached to said fastener-carrying structure by entrance through the aperture at that side of the structure at which the aperture is exposed, said snap fastener member comprising a base part elongated in one direction to pass through the elongated aperture, said base being turned to underlie said structure in a relation cross-wise to the greatest length of the elongated aperture therein, means locking the said base against substantial turning movement when attached to the said fastener-carrying structure, a washer fitting in said aperture and providing means to assist in guiding the base into proper attached relation to the said structure, and said fastener member having a stud shank extending from said base through an aperture in the said washer and presenting a stud head for engagement with a cooperating socket means.

5. A snap fastener installation comprising, in combination, a fastener-carrying structure having an elongated aperture, a covering material applied to said structure to cover the aperture at one side and a snap fastener member attached to said fastener-carrying structure by entrance through the aperture at that side of the structure at which the aperture is exposed, said snap fastener member comprising a base part elongated in one direction and turned to engage said structure at that side adjacent to the covering material to secure the snap fastener member to the said fastener-carrying structure and a lost motion connection between said fastener member and said structure to permit lateral movement of the fastener member relative to said structure and to lock the fastener member against accidental turning of the base, said lost motion connection comprising an aperture in the said structure and a projection of smaller cross-sectional area projecting from said base into said aperture.

6. A snap fastener installation comprising, in combination, a fastener-carrying structure having an elongated aperture, a covering material applied to said structure to cover the aperture at one side and a snap fastener member attached to said fastener-carrying structure by entrance through the aperture at that side of the structure at which the aperture is exposed, said snap fastener member comprising a base part elongated in one direction and turned to engage said structure at that side adjacent to the covering material to secure the snap fastener member to the said fastener-carrying structure and a lost motion connection between said fastener member and said structure to permit lateral movement of the fastener member relative to said structure and to lock the fastener member against accidental turning of the base, said lost motion connection comprising apertures in said structure above the underlying portions of said base and projections of smaller cross-sectional area than said apertures extending from said base into said apertures.

7. A snap fastener installation comprising, in combination, a fastener-carrying structure having an elongated aperture, a covering material applied to said structure to cover the aperture at one side and a snap fastener member attached to said fastener-carrying structure by entrance through the aperture at that side of the structure at which the aperture is exposed, said snap fastener member comprising a base part elongated in one direction and turned to engage said structure at that side adjacent to the covering material to secure the snap fastener member to the said fastener-carrying structure, a lost motion connection between said fastener member and said structure to permit lateral movement of the fastener member relative to said structure and to lock the fastener member against accidental turning of the base, said lost motion connection comprising an aperture in the said structure and a projection of smaller cross-sectional area projecting from said base into said aperture and a washer fitting into the elongated aperture and providing means for guiding the fastener member during engagement with the carrying structure thereby to secure registry of the projection on the base with its cooperating aperture in the said structure.

8. A snap fastener installation comprising, in combination, a relatively rigid fastener-carrying structure having an elongated aperture, a snap fastener member attached to said fastener-carrying structure by entrance through the aperture at that side of the structure at which the aperture is exposed, said snap fastener member having a base part elongated in one direction and turned to engage said structure substantially crosswise of the aperture to secure the snap fastener member to said fastener-carrying structure and base-positioning means cooperating between the base of the snap fastener member and the fastener-carrying structure to prevent the fastener from accidental turning so that the base may become aligned with the elongated aperture while permitting lateral movement of the fastener member in all directions relative to the fastener-carrying structure.

In testimony whereof, I have signed my name to this specification.

MOSES F. CARR.